July 22, 1924.
N. E. BUNTING
1,501,941
FEEDING MECHANISM FOR POTATO PLANTERS
Filed Dec. 19, 1919     3 Sheets-Sheet 1
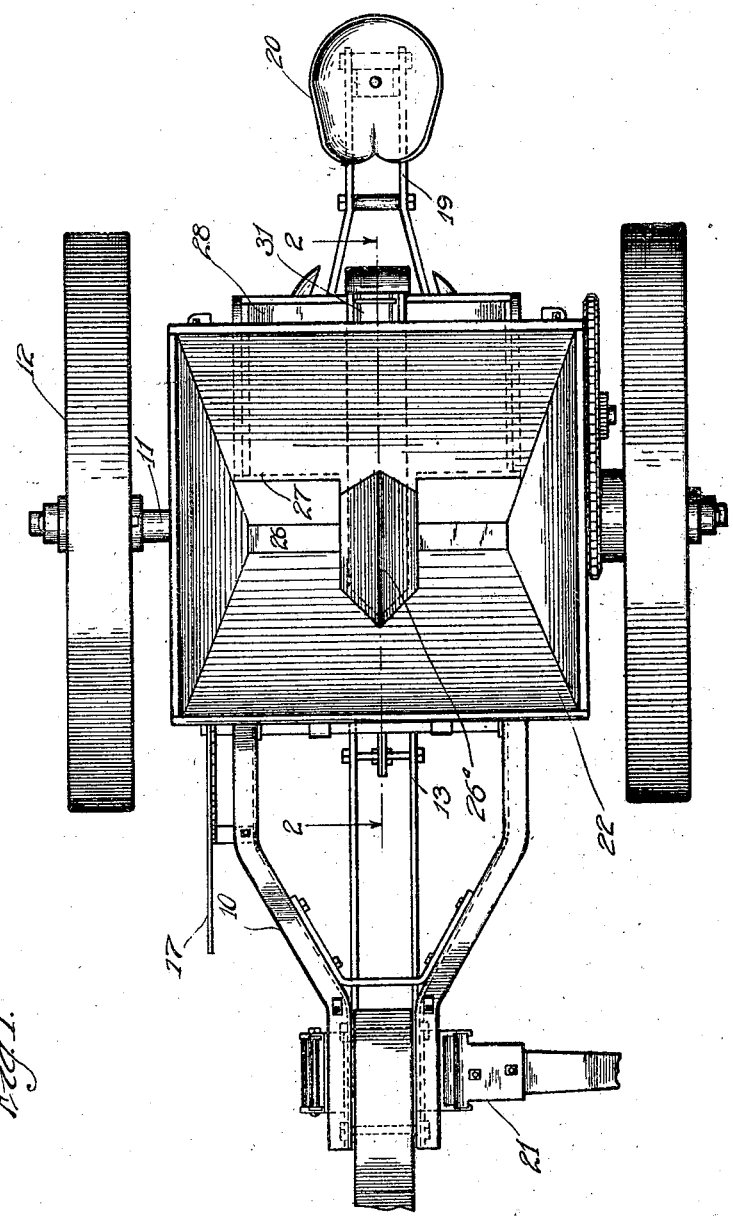
Inventor:
Norman E. Bunting,
By John P Smith
Atty.

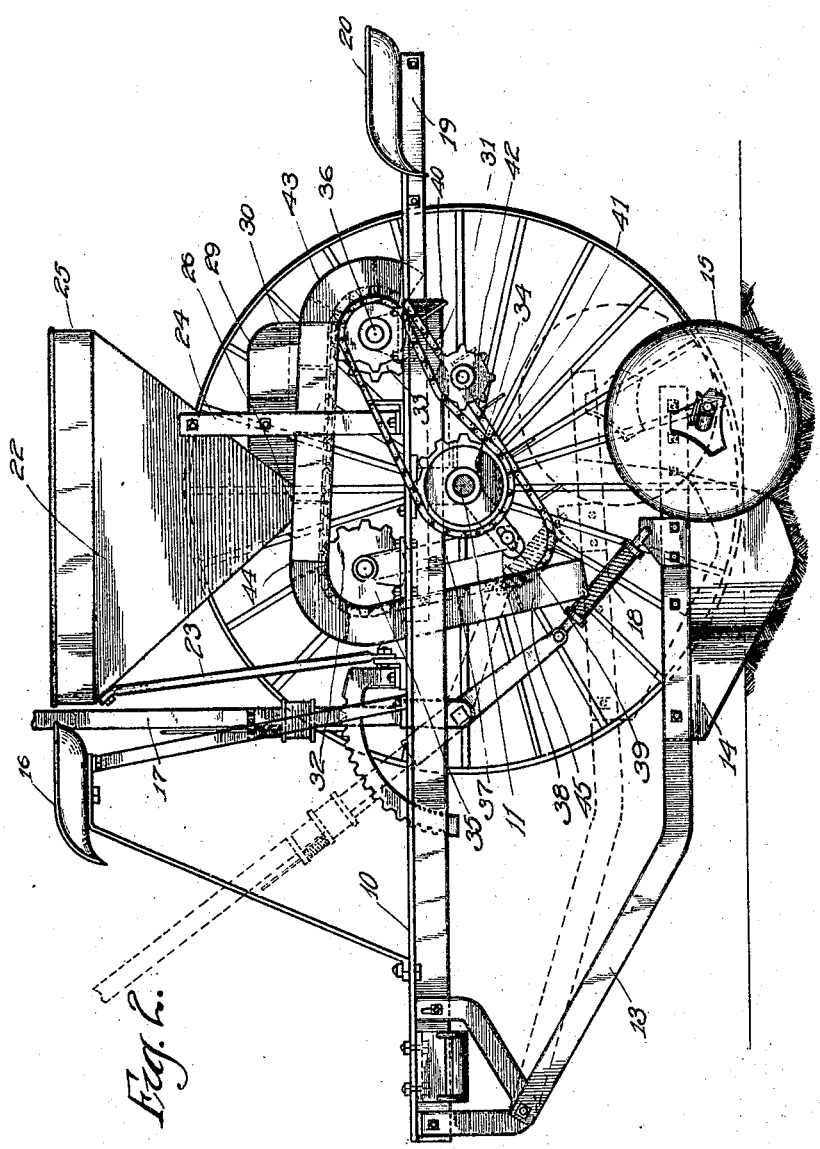

July 22, 1924.
N. E. BUNTING
FEEDING MECHANISM FOR POTATO PLANTERS
Filed Dec. 19, 1919    3 Sheets-Sheet 3
1,501,941
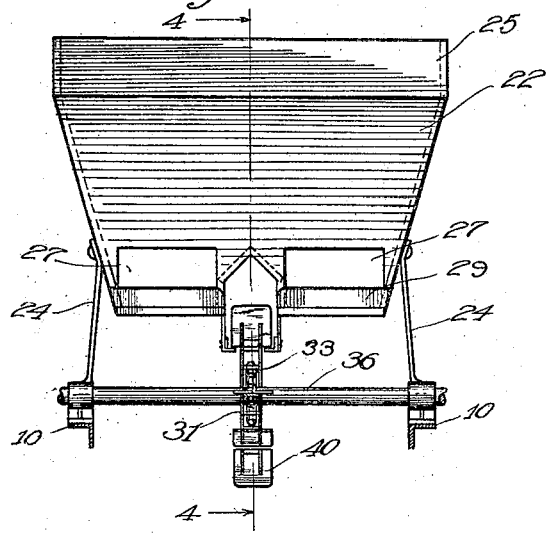
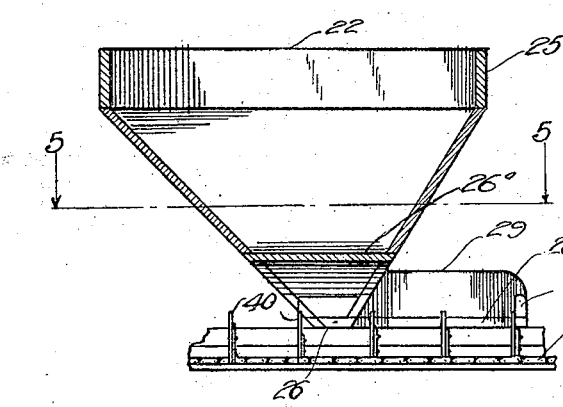
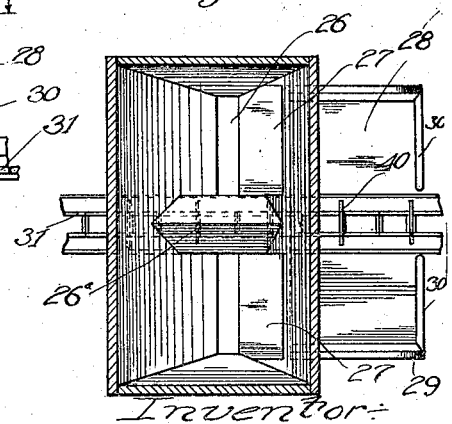
Inventor:
Norman E. Bunting
By John P. Smith
Atty.

Patented July 22, 1924.

1,501,941

UNITED STATES PATENT OFFICE.

NORMAN E. BUNTING, OF CHICAGO, ILLINOIS, ASSIGNOR TO INTERNATIONAL HARVESTER COMPANY, A CORPORATION OF NEW JERSEY.

FEEDING MECHANISM FOR POTATO PLANTERS.

Application filed December 19, 1919. Serial No. 346,181.

*To all whom it may concern:*

Be it known that I, NORMAN E. BUNTING, a citizen of the United States, residing at Chicago, in the county of Cook and State of Illinois, have invented certain new and useful Improvements in Feeding Mechanism for Potato Planters, of which the following is a full, clear, and exact specification.

This invention pertains to planters, and more particularly to a mechanism for delivering or feeding potatoes from a hopper to the planting device.

One object of my invention is to provide a construction that will deliver seed potatoes one by one to the planting element, that is simple and certain in operation and in which an attendant can pass seed potatoes from the hopper to the dropping chute conveniently and with little effort.

Another object is to provide feeding means which permits the seed potatoes to be pushed or swept by the hands of the attendant from receiving tables to the dropping mechanism without necessitating the picking up and placing of each potato by hand as heretofore the rule in this type of machine.

Another object of my invention is to provide a hopper of large capacity and having outlets that provide a constant supply of seed potatoes to receiving tables on both sides of the machine.

With these main and other incidental objects in view my invention consists of the organization, details of construction, parts, or their equivalents, hereinafter described and more particularly defined in the claims.

Referring to the drawings—

Fig. 1 is a plan view of a planter embodying my invention;

Fig. 2 is a side elevation with the near wheel removed and with one of the planting elements shown in elevated position in dotted lines;

Fig. 3 is a rear elevation of the hopper with the conveyor shown broken away;

Fig. 4 is a vertical section through the hopper on the line 4—4 of Fig. 3; and

Fig. 5 is a horizontal section through the hopper on the line 5—5 of Fig. 4.

In this instance the planter embodying my invention comprises a main frame 10 supported on axle 11 and wheels 12 and having suspended beneath it drag bars 13 carrying the furrow openers 14 and covering disks 15. The frame carries the usual driver's seat 16 convenient to which there is mounted the drag bar adjusting lever 17 connected by a spring link 18 to the bar. At the rear of the main frame there are supports 19 on which an attendant's seat 20 is secured. At the front of the frame is mounted the usual marker arm 21.

The parts and arrangement just described are of known construction and form no part of my present invention. The construction and arrangement of parts comprising my invention will now be described.

Above the main frame and extending the full width thereof is a hopper 22 which is supported on the frame by means of front bars 23 and rear bars 24 which may be bolted to the sides of the hopper and to the lateral members of the frame, as shown on the drawing. The hopper is formed with the upper vertical edge 25 from which the sides of the hopper slope downwardly to a narrow bottom 26. The slope of the front and rear walls is considerably steeper than the lateral walls. The bottom of the hopper is divided by a fore and aft arched partition $26^a$ on each side of which there is an outlet 27 at the bottom of the rear wall. Extending rearwardly from the bottom of the hopper immediately below each outlet is a receiving table 28. Each table has a lateral or side rim or flange 29 and a rear or outer rim 30 which preferably is less than half the height of the lateral rim and the inner edge of each table is rimless as best seen in Fig. 5. These tables are spaced from each other a distance equal to the width of the arched partition $26^a$ above mentioned. Below the tables and the hopper there is mounted an endless conveyor 31 which is equal in width to the space between the inner edges of the tables and travels over sprockets designated 32, 33 and 34 respectively. The sprockets 32 and 33 are carried on shafts 35 and 36 journaled above the frame and sprocket 34 is journaled on a shaft in front of the axle and under the frame and is carried in the ends of links 37 and 38 extending from shaft 35 and axle 11 respectively. Links 38 are preferably formed with short slots 39 in which links the ends of the shaft 11 carrying sprocket 34 are clamped and which permit adjustment of said shaft and sprocket 34 to preserve proper tension of the conveyor. The conveyor may be of the link type illustrated and has blades or wings 40 secured thereto at suitable spaced intervals and extending perpendicularly therefrom. The shaft 36 is the drive shaft for the conveyor and is driven by a sprocket chain 41 from the axle. This chain passes over the usual tightener 42. The arrangement of sprockets described causes the conveyor to travel over a triangular path with an upper reach passing between the tables and beneath the hopper in a substantially horizontal direction, and with an approximately vertical reach passing downwardly in front of the axle. In its course above the frame the conveyor passes within a channel 43 of which it forms the bottom and which is open for a distance corresponding approximately to the length of the tables and the bottom of the hopper, and which again becomes closed at 44 and follows the conveyor downwardly, forming a delivery chute 45.

During the operation of the machine the attendant is seated on seat 20 in convenient reach of the tables 28. With the planter in motion, the conveyor travels forward between the tables, and the hopper provides a supply of potatoes to each table. The attendant using one hand on each table, can push or sweep potatoes over the inner edge of either table into one of the divisions of the conveyor, as they pass. Owing to the low rear rims of the tables, the attendant's hands are practically on a level with the surface of the tables when his forearms are resting on said rims and as the conveyor is below the level of the tables, no lifting and dropping of each potato by hand is necessary. As at least three divisions of the conveyor are always exposed, skipping is practically impossible.

While I have illustrated the preferred embodiment of my invention, such variations may be made as come within the scope of the annexed claims.

What I claim is:

1. In potato feeding mechanism, the combination of a hopper, spaced outlets at the bottom of its rear wall, a table extending rearwardly below each outlet and a conveyor between the tables and extending beneath the hopper.

2. In potato feeding mechanism, the combination of a hopper, a fore and aft arched portion dividing the bottom of the hopper, an outlet at the rear wall of the hopper on each side of the arched portion, a table extending rearwardly below each outlet and a conveyor between the tables and passing beneath the arched portion of the hopper.

3. In potato feeding mechanism, the combination of a hopper, spaced outlets at the bottom of its rear wall, a table extending rearwardly below each outlet and an endless conveyer having a horizontal run passing between the tables.

4. In potato feeding mechanism, the combination of a hopper, a fore and aft arched portion dividing the bottom of the hopper, an outlet in the rear wall of the hopper on each side of the arched portion, a table extending rearwardly below each outlet and an endless conveyor having a horizontal run passing between the tables and beneath the arched portion of the hopper.

5. In dispensing mechanism, the combination of a pair of spaced tables, a hopper provided with means for supplying each table, a conveyor between the tables and a delivery chute to which said conveyor leads.

6. In dispensing mechanism, the combination of a pair of spaced tables, a hopper provided with means for supplying each table, an endless conveyor provided with spaced receptacles passing between the tables and a chute into which said conveyor passes.

7. In potato feeding mechanism, the combination of a pair of spaced tables, a hopper provided with means for supplying potatoes to each table, an endless chain conveyor provided with spaced vertical blades and having a horizontal run passing between and below the tables with the top of its blades substantially level with the surface of the tables and a delivery chute mounted forward of the tables and through which a downward run of the conveyor passes.

8. In potato feeding mechanism, the combination of a hopper having an outlet at one side, a table extending from the lower margin of the outlet, a low rim on the outer edge of the table adapted to form an arm rest, a high rim on one side edge of the table cooperating with the low rim to close two sides of the table, the opposite side edge being rimless, and a conveyor positioned adjacent the rimless edge of said table.

9. In potato feeding mechanism, the combination of a hopper having an outlet at one side, a table extending from the lower margin of said outlet, a rim closing one side edge and the outer edge of said table, the opposite side edge being rimless, the rim on the outer edge being shaped to provide an arm rest, and a conveyor positioned adjacent the rimless edge of said table.

In testimony whereof I affix my signature.

NORMAN E. BUNTING.